US008272394B2

(12) United States Patent
Ball et al.

(10) Patent No.: US 8,272,394 B2
(45) Date of Patent: *Sep. 25, 2012

(54) DOUBLE CHECK BACK FLOW PREVENTION DEVICE (75) Inventors: William T. Ball, Colorado Springs, CO (US); Eric Pilarczyk, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/241,039

(22) Filed: Sep. 22, 2011

(65) Prior Publication Data

US 2012/0012194 A1    Jan. 19, 2012

Related U.S. Application Data (63) Continuation of application No. 12/126,476, filed on May 23, 2008, now Pat. No. 8,042,565.

(51) Int. Cl.
E03C 1/10 (2006.01)
(52) U.S. Cl. ........................................................ 137/218
(58) Field of Classification Search .................. 137/217, 137/218
See application file for complete search history.

(56) References Cited

U.S. PATENT DOCUMENTS

| 2,306,012 A | 12/1942 | Campbell |
| 3,155,107 A | 2/1950 | Woodford |
| 2,893,418 A | 7/1959 | Leventhal |
| 3,905,382 A | 9/1975 | Waterston |
| 4,013,088 A | 3/1977 | Gocke et al. |
| 4,284,097 A * | 8/1981 | Becker et al. ........... 137/218 |
| 4,712,575 A | 12/1987 | Lair |
| 4,976,279 A | 12/1990 | King, Sr. et al. |
| 4,984,306 A | 1/1991 | Sumerix |
| 5,228,470 A | 7/1993 | Lair et al. |
| 5,813,428 A | 9/1998 | Almasy et al. |
| 7,013,910 B2 | 3/2006 | Tripp |
| 7,434,593 B2 | 10/2008 | Noll et al. |
| 8,042,565 B2 | 10/2011 | Ball |
| 2006/0117734 A1 | 6/2006 | Larkin et al. |
| 2008/0047612 A1 | 2/2008 | Ball |

OTHER PUBLICATIONS

"VB-222 Self-Draining Hose Connection Vacuum Breaker", A.W. Cash Value Company Model VB-222, Mar. 12, 2008, pp. 1-2.
Official Action for Canadian Patent Application No. 2,666,533, dated Mar. 3, 2011.
Official Action for U.S. Appl. No. 12/126,476, mailed Feb. 9, 2011.
Official Action for U.S. Appl. No. 12/126,476, mailed Jun. 14, 2011.
Notice of Allowance for U.S. Appl. No. 12/126,476, mailed Aug. 18, 2011.

* cited by examiner

*Primary Examiner* — Craig Schneider
(74) *Attorney, Agent, or Firm* — Sheridan Ross P.C.

(57) ABSTRACT

A double valve is provided that includes an in-line inlet check valve and an outlet check valve that cooperate to prevent back flow of fluid through the valve. The check valve also includes at least one vent that allows for fluid trapped within the check valve to drain, thereby preventing freezing of the check valve and hydrant to which it is interconnected. The check valve provided omits many superfluous components and thus is smaller and easier to install than check valves of the prior art.

17 Claims, 12 Drawing Sheets

DOUBLE CHECK BACK FLOW PREVENTION DEVICE

CROSS REFERENCE TO RELATED APPLICATION

This application is a continuation of U.S. patent application Ser. No. 12/126,476, filed May 23, 2008, the entire disclosure of which is incorporated by reference herein.

FIELD OF THE INVENTION

Embodiments of the present invention are generally related to back flow preventors that interconnect to a water source. More particularly, devices that attach to a sill cock, or any other fluid source, to prevent back flow of fluids, that may contain contaminants into the fluid supply are provided.

BACKGROUND OF THE INVENTION

Almost all buildings include some type of exterior fluid delivery system. The most common outdoor fluid delivery system is comprised of a faucet with a handle for actuating a valve that initiates or ceases fluid flow from a fluid source through a sill cock of the faucet. In order to direct the exiting fluid, it is also well known to employ a hose that is threadingly interconnected to the sill cock. Fluid in the hose may, under certain conditions, enter the faucet and ultimately the fluid source. For example, if the fluid pressure in the hose is greater than the fluid supply pressure "back flow" will occur. Such back flow may be harmless. One skilled in the art will appreciate, however, that the fluid in the hose could be harmful and result in spoilage of the water supply or contamination of fluid dispensing apparatus often interconnected to the hose.

One source of contamination includes pesticides and/or fertilizers that are often associated with a delivery system that is interconnected to the open end of the hose. Fluid from the supply is used to dilute those harmful chemicals in the delivery system prior to being distributed. Most municipalities require that a one-way check valve be included in a fluid supply line that delivers water from a public water source to a dwelling so that contaminated water cannot enter the public water supply from the dwelling. Often, there is no requirement that dictates that similar precautions are taken with respect to an exterior fluid delivery system that is associated with a dwelling. It is entirely conceivable that contaminants entering a dwelling from an outside fluid source will affect individuals associated within the dwelling but not the public at large. Further, if the above-mentioned check valve is absent or malfunctioning contaminants could also enter the public water supply via the dwelling.

Another issue related to back flow is the harmful effects of freezing when supply pressure is reduced and/or flow is stopped wherein liquid accumulates within the faucet and/or related plumbing. When the ambient temperature drops, the trapped liquid may freeze potentially causing severe damage to the faucet interconnected check valve and/or associated plumbing. To address this freezing, draining features have been incorporated into prior art check valves, such as the A. W. Cash Valve Company Model VB-111, which includes a stem that must manually be actuated to allow drainage when a hose is not connected. This type of manually draining valve relies on an operator to drain the valve, and is thus not reliable. Self-draining check valves, however, are also known in the art and are disclosed in U.S. Pat. No. 4,712,575 to Lair ("Lair I"), which is incorporated by reference herein. Lair I discloses a self-draining, single valve back flow preventor. When a hose is detached, a spool succumbs to spring pressure and moves axially outwardly from the outlet end of the check valve. A valve, housed within the spool, is thus allowed to move axially from its sealing washer to permit drainage. When the hose is connected, the spool and the valve housed therein, are forced axially toward a sealing washer to create a seal that prevents back flow. Vent holes in the check valve prevent accumulation of back pressure within the valve. Sufficient water pressure during supply flow with the hose attached overcomes a spring used to seat the valve and deflects a vent sealing washer, thereby sealing the vent holes. One drawback of the Lair valve is that foreign material may lodge between the valve and the sealing washer, creating a passage through which back flow may occur.

One way to address the major drawback of Lair I is to provide a second check valve. U.S. Pat. No. 3,905,382 to Waterston ("Waterston"), which is incorporated herein, discloses a check valve with two normally closed spring biased valves, one inside an outlet, and the other located near an inlet. The central portion of the Waterston check valve has an externally-threaded vent outlet. When flow occurs, the supply pressure forces the inlet valve axially from its seat toward the outlet and seals the vent. As flow progresses to the outlet valve, the flow pressure compresses an outlet spring and fluid is free to flow from the check valve. When flow ceases and back flow pressure is sufficient to overcome the valve in the outlet, liquid accumulates in the sealed tube and is discharged through a vent.

The Waterston valve does not provide a draining feature that relieves accumulated liquid upstream from the check valve. In the event of freezing the accumulation of liquid upstream from the check valve can result in severe damage to the check valve and plumbing upstream of the check valve. In addition, contamination may collect in the internal portion of the check valve such that when a back flow condition occurs, the contamination trapped in the check valve may enter the fluid supply.

Another system that employs more than one check valve to prevent back flow of a liquid into a distribution system by eliminating pressure differentials that may occur between the faucet and interconnected hose, is the V-444 Valve ("V-444") manufactured by A. W. Cash Valve Company. The V-444 is succinctly described in U.S. Pat. No. 5,228,470 to Lair et al. ("Lair II"). The V-444 employs three separate valves enclosed in a housing that allows drainage of the sill cock after the hose is removed and also prevents backflow into the structure. The V-444 includes an outer housing with an internally situated movable spool. The spool includes an o-ring positioned on an angled upper surface thereof that cooperates with an angled inner surface of the housing to define a first valve that selectively opens and closes an outer passage that allows trapped fluid in the sill cock to drain from a plurality of vent holes. The V-444 also includes an inlet check valve and an outlet valve that controls fluid through the valve and that prevents backflow.

In a first mode of use, wherein no hose is connected and supply pressure is absent, the V-444 is self-draining A spring forces the spool downwardly to open a fluid path that drains fluid from the sill cock through the plurality of vent holes. Fluid trapped within the inlet and outlet check valves also drains from the outlet of the valve.

In a second mode of use, wherein the V-444 is exposed to supply pressure without a hose interconnected, the spring will force the spool downwardly, thereby creating a path for water to flow through the vents of the check valve. The supply pressure will also deflect the inlet check valve and the outlet check valve so that fluid will be able to exit the valve system.

In a third mode of operation, a hose is interconnected to the outlet portion of the V-444, but no supply pressure is provided. Any back pressure generated by fluid in the hose will force the outlet check valve to seat upon a surface provided by the spool. In this configuration, a hose forces the spool upward, thereby closing the first valve so that any fluid within the inlet check valve on the outlet valve can only travel out of the vents and not into the fluid supply.

In a fourth mode of operation, supply pressure is added to the V-444 with a blocked interconnected hose. Here, fluid from the fluid supply causes a seal to deflect, thereby blocking the vents. In addition, the outlet check valve is seated as described above, thereby preventing fluid from entering into the center of the V-444.

The V-444 includes a fifth mode of operation that is similar to the fourth mode wherein the hose is open to free flow. Again, since the hose is interconnected, the first valve is closed. Fluid pressure causes the inlet valve to transition downwardly to seat on the stem, thereby allowing fluid to flow through the center of the inlet check valve. The fluid pressure also pushes the outlet valve downwardly from its seat on the stem, which allows fluid to freely flow into the hose.

Among the major drawbacks of the V-444 are its size, weight, dimensions and inclusion of components that add to its complexity and expense, thereby rendering it unsuitable for use in various situations. More specifically, the V-444 check valve is approximately 2.2 inches in length and 1.9 inches in diameter and weighs about 200 grams. This size is attributed to the use of complex valving mechanisms and the provision of a first valve that includes a movable spool.

Other back flow preventors have been employed such as those similar to the backflow preventor shown and described in U.S. Pat. No. 7,013,910 to Tripp ("Tripp"), which is incorporated by reference herein. Tripp discloses an in-line backflow preventor that is used in fluid carbonation systems is interconnected between a fluid source and a mixing tank. The pressure in the mixing tank of these systems is often greater than the source pressure. Tripp is designed for either continuous down-steam pressure increases or intermittent downstream pressure variations. Accordingly, Tripp does not have the capability of releasing pressure upstream of the valve outlet. Further, Tripp, due to its normally closed configuration, does not automatically drain or contain other similar features that are required for freeze prevention.

SUMMARY OF THE INVENTION

It is one aspect of the present invention to provide a double check valve for interconnection to a sill cock associated with an outside water source that prevents back flow into the water supply. Back flow can occur as a result of a siphon condition wherein a vacuum exists within the check valve, the sill cock or the water source that is apt to suction water in a hose, or in the interconnected check valve into the water supply. A back flow condition may also occur when the fluid pressure within the hose is greater than that of the water supply. For example, if the hose was taken to a roof of a building, the resulting head pressure may be greater than the supply pressure. In addition, a temporary loss or interruption in supply pressure may create a pressure differential that would create a back flow situation. The embodiments of the present invention also provide freeze protection wherein water inside the sill cock is allowed to freely drain from the double check valve after supply pressure is removed.

Embodiments of the present invention employ a valve body that includes an inlet check valve and an outlet check valve positioned within a valve body and a valve cap. The inlet check valve includes an inlet check seal and is biased from the outlet check valve via a spring (or other similar resiliently deflectable member). The inlet check seal cooperates with a main seal that is positioned between the valve body and the valve cap of the double check valve. The outlet check valve is comprised of an outlet check body with an outlet check seal that selectively engages a seat provided in the valve body. The outlet check body and the inlet check body are preferably selectively interconnected to each other, which will be described in further detail below. A hose plunger, which is adapted to selectively engage a hose, is preferably slidingly interconnected to the double check valve and is biased by a compressive member, such as a spring (or other similar resiliently deflectable member), that is associated with the seat of the valve body. The hose plunger includes a centralized hub that engages an outlet check spring (or other similar resiliently deflectable member) that is associated with the outlet check body. This combination of components is sufficient to prevent back flow and to provide self-draining (e.g. promote freeze resistance) without the need of a third check valve to control fluid flow through the vents. Detailed descriptions of the functionality of certain embodiments of the present invention will be provided below.

It is thus another aspect of the present invention to provide a check valve that omits or is devoid of components employed in prior art systems, thus rendering embodiments of the present invention easier and less expensive to manufacture, lighter, less complex, less prone to malfunction, and easier to repair. More specifically, embodiments of the present invention omit additional valves but continue to provide the same functionality of check valves of the prior art, such as the V-444 described above. That is, a system is provided that more effectively employs less than three valves and preferably two valves, thereby allowing size, weight and failure reduction. For example, it is contemplated that the double check valve of embodiments of the present invention are about ⅓ the size (preferably an about 70% reduction) of the V-444 check valve, which reduces bulk, weight and facilitates installation. Preferably, the check valve of one embodiment of the present invention is approximately 1.2 inches in length (an about 44% reduction) and approximately 1.4 inches in diameter an about 26% reduction) and weighs about 130 grams (an about 35% reduction). In one embodiment, this reduction in size and weight is attributed to the omission of a spool and a stem that controls flow out of the vents of the V-444 check valve. To achieve this, embodiments of the present invention allow for drainage from a point other than through vents in a valve body, for example, drainage from the outlet of the double check valve as opposed to primarily through vents provided in a valve body, as is done by the V-444 check valve. In addition, the present invention employs a fixed inlet valve and a fixed outlet valve as opposed to the complicated valving scheme employed by the V-444, wherein a movable spool alters the configuration of the internal volume of the valve depending on flow condition.

It is still yet another aspect of the present invention to provide a check valve that meets the American Society of Safety Engineers (ASSE) regulations. More specifically the check valve of embodiments of the present invention meets the requirements of ASSE 1052.

It is another aspect of the present invention to provide a valving system that is dual use. More specifically, embodiments of the present invention possess the capabilities of an in-line valve as disclosed in Tripp and the ability to provide automatic self draining when a hose is disconnected from the valve. The double check valve, preferably, employs normally opened inlet and outlet check valves, which allows for complete and automatic drainage. When a hose is interconnected to the dual check valve, the inlet and outlet check valves close, and will open when the faucet is turned on, for example. Normally opened (present invention) and normally closed (in-line) valves are different and are regulated separate ASSE standards. Normally opened check valves are regulated by ASSE 1052 and in-line valves are regulated by ASSE 1022. ASSE 1022 concerns backflow prevention devices that protect potable water supplies that serve beverage dispensing equipment. ASSE 1022 requires that two independently acting check valves be used that are biased to a normally closed position. Conversely, ASSE 1052 concerns basic performance requirements and test procedures for backflow preventors that are designed to interconnect to a hose. ASSE 1052 valving systems are designed to protect against backflow due to back siphonage and low-head backpressure, under the high hazard conditions present at a hose threaded outlet. ASSE 1052 also requires that the inlet and outlet check valves be biased closed. Embodiments of the present invention comply with ASSE 1052 when a hose is interconnected thereto and provide needed automatic drainage when the hose is disconnected, a technological advancement over the prior art and an improvement over prior art devices similar to Tripp.

Accordingly, it is one aspect of the present invention to provide a back flow prevention device for interconnection to a sill cock that includes a valve body with threads that are adapted to receive a hose, the valve body also having an inlet volume and an outlet volume separated by an internally-disposed wall, a lower surface of the wall defining a valve seat, the valve body further including a vent that provides a flow path between the outside of the valve body and the inlet volume; a seal positioned with the valve body in a volume located adjacent to the inlet volume, the seal adapted to selectively block the vent; a valve cap interconnected to the valve body that is positioned within the volume that maintains the seal against the valve body, the valve cap having threads for interconnection to a sill cock of a faucet; an inlet check valve comprising: an inlet check spring positioned within the inlet volume, wherein the spring contacts an upper surface of the wall, an inlet check body positioned within the inlet check spring, an inlet check seal interconnected to the inlet check body that is adapted to selectively engage the seal, thereby opening and closing an aperture of the seal to control fluid flow from the valve cap into the inlet volume; a drain spring positioned within the outlet volume that contacts the seat and a plunger that is adapted to engage a hose; an outlet check valve comprising: an outlet check body positioned within the drain spring, an outlet check seal interconnected to the outlet check body that is adapted to selectively engage the seat to either open a flow path between the inlet volume and outlet volume, or isolate the outlet volume from the inlet volume, thereby preventing fluid from flowing from an interconnected hose into the sill cock; and an outlet check spring positioned about the outlet check body that contacts a portion of the outlet check body and a hub of the plunger.

More generally, it is an aspect of the present invention to provide a back flow prevention device, that includes a valve body with a fixed inlet volume and a fixed outlet volume, the valve body also having a vent for allowing fluid from inside the valve body to escape; a valve cap; a seal positioned between the valve cap and the valve body; an inlet check valve positioned within the inlet volume; and an outlet check valve positioned within the outlet volume.

In addition, it is an aspect of the present invention to provide a back flow prevention device including a body with a fixed inlet volume and a fixed outlet volume, the body also having an aperture; a cap; a primary means for sealing positioned between the cap and the body; an inlet means for selectively preventing flow of fluid positioned within the inlet volume; and an outlet means for selectively preventing flow of fluid positioned within the outlet volume.

Further, one of skill in the art will appreciate upon review of this disclosure that it is another aspect of the present invention to provide a water delivery system including a faucet associated with a water supply; a valve associated with the faucet that is adapted to selectively control the flow of fluid from the water supply through the faucet; and a double check valve associated with the faucet that prevents fluid from entering the water supply and that allows fluid within the faucet to drain therefrom when the valve is in the off position, the double check valve comprising: a valve body with a fixed inlet volume and a fixed outlet volume, the valve body also having a vent for allowing fluid from inside the valve body to escape, a valve cap, a seal positioned between the valve cap and the valve body, an inlet check valve positioned within the inlet volume, and an outlet check valve positioned with the outlet volume.

It is also an aspect of the present invention to provide a back flow prevention device that employs a housing having a passageway configured for the transport of a fluid therethrough, the housing having an inlet and an outlet, the passageway encompassing a valve system consisting essentially of: a first check valve disposed in the passageway that allows fluid to flow through the passageway in the direction from the inlet to the outlet; and a second check valve disposed in the passageway that allows fluid to flow through the passageway in the direction from the inlet to the outlet; a diaphragm disposed in the passageway adapted to engage at least one of the first check valve and the second check valve; a vent in fluid communication with the passageway and located between the first and second check valves, the vent selectively isolated from the passageway by the diaphragm, the vent adapted to permit fluid located between the first and second check valves to exit the housing through the vent, whereby the back flow prevention device permits substantially all fluid to drain completely from the device.

It is still yet an aspect of the present invention to provide a back flow prevention device that includes a housing having first and second ends and including a means for connecting to a fluid inlet line at the first end and for connecting a fluid outlet line to the second end; a central cavity within the housing; wherein the housing includes a valve system consisting essentially of first and second drain valves and is devoid of a third drain valve, the first drain valve located within the housing between the central cavity and the fluid inlet line to permit drainage of fluid from the fluid inlet line to the fluid outlet line end of the housing when the fluid outlet line is not connected thereto, and the second valve located within the housing between the central cavity and the fluid inlet line to control flow between the fluid inlet line and the central cavity, whereby the back flow prevention device permits substantially all fluid to drain completely from the device.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

To assist in the understanding of the present invention the following list of components and associated numbering found in the drawings is provided herein:

| #   | Components          |
|-----|---------------------|
| 2   | Double check valve  |
| 4   | Hose                |
| 6   | Inlet check valve   |
| 10  | Outlet check valve  |
| 14  | Valve body          |
| 18  | Valve cap           |
| 22  | Vent                |
| 26  | Outlet              |
| 30  | Inlet               |
| 34  | Main seal           |
| 38  | Inlet check seal    |
| 42  | Threads             |
| 46  | Knurls              |
| 50  | Hose plunger        |
| 51  | Faucet              |
| 52  | Valve               |
| 54  | O-ring              |
| 58  | Wrench flats        |
| 62  | Annular jut         |
| 66  | Inlet check body    |
| 70  | Hooked surface      |
| 74  | Inlet check spring  |
| 78  | Seat                |
| 80  | Passage             |
| 82  | Drain spring        |
| 86  | Outlet check body   |
| 90  | Hollow portion      |
| 94  | Slot                |
| 98  | Stop                |
| 102 | Outlet check seal   |
| 104 | Outlet check spring |
| 108 | Cylindrical portion |
| 112 | Protrusion          |
| 116 | Hub                 |
| 118 | Upper surface       |
| 120 | Lip                 |
| 124 | Stop                |
| 128 | Thumb screw hole    |
| 132 | Hose washer         |
| 134 | Fluid               |
| 136 | Ring                |
| 140 | Groove              |
| 142 | Inner surface       |
| 144 | Bottom inner surface|
| 150 | Inlet check seal groove |
| 154 | Outlet check seal groove |

It should be understood that the drawings are not necessarily to scale, although particular perspective dimensions may be relied upon to define the present invention. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 1-12, a double check valve 2 is provided that includes an inlet check valve 6 and an outlet check valve 10 positioned in a valve body 14. The valve body 14 receives a valve cap 18 that is adapted for interconnection to a sill cock of a faucet, for example. The valve body 14 also includes a plurality of vents 22 that allow for drainage of fluids from the sill cock, the inlet check valve 6 and/or outlet check valve 10 depending on the pressure gradient within the double check valve 2. Embodiments of the present invention thus allow fluid within the sill cock to drain from the double check valve to prevent freezing. Back flow is prevented such that when pressure at an outlet 26 of the double check valve is greater than the pressure at the inlet 30, which is in communication with a fluid supply, a main seal 34 (or diaphragm) will cooperate with an inlet check seal 38 to prevent back flow from entering the fluid supply. Excess water then will be trapped within the inlet check valve 6 or outlet check valve 10 (when a hose is interconnected to the check valve), or be drained from the vents 22. If no hose is interconnected, trapped fluid is able to drain from the inlet and outlet valves as well.

Figure 1:
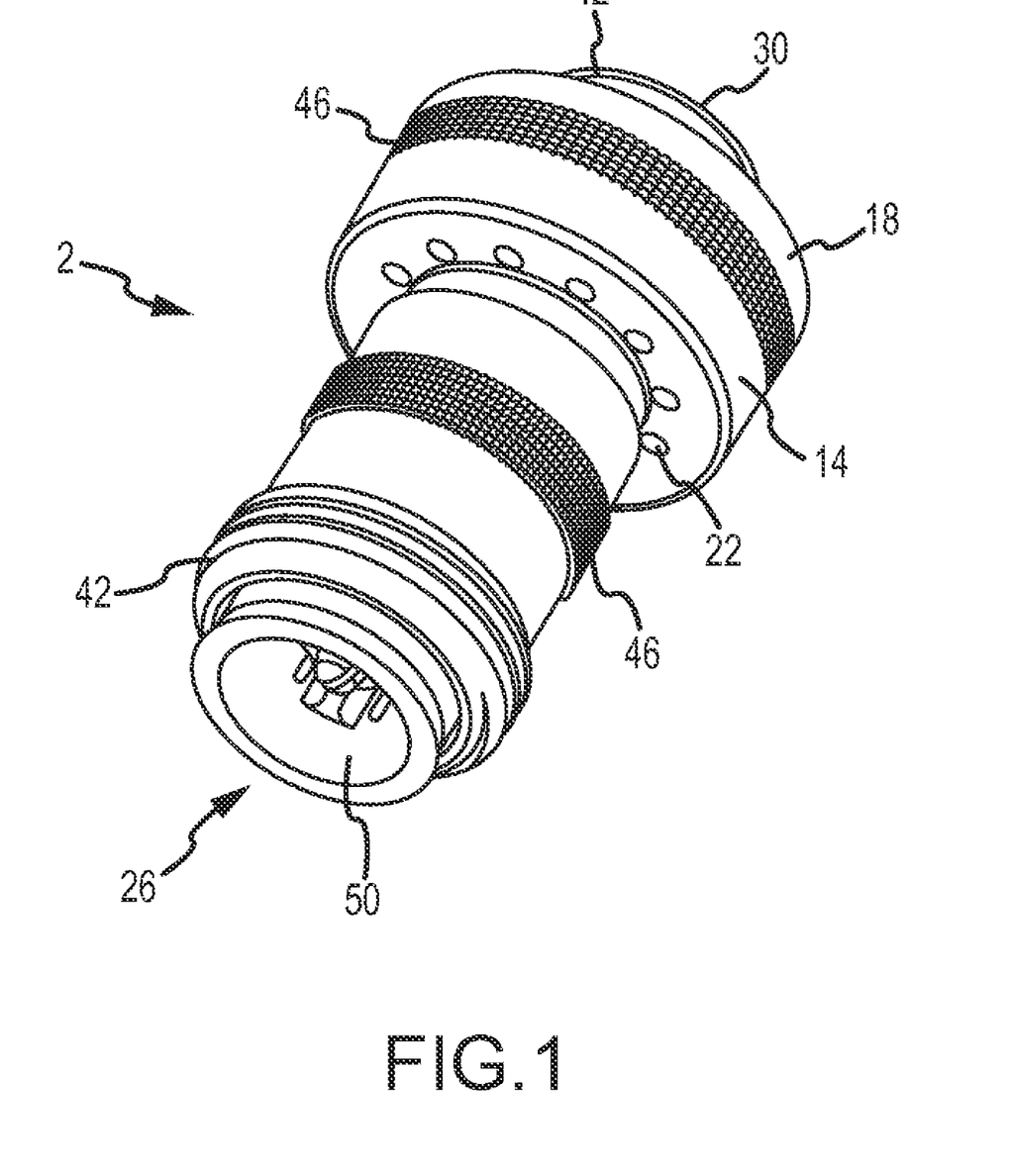
FIG. 1 is a perspective view of a double check valve of one embodiment of the present invention.
Figure 1A:
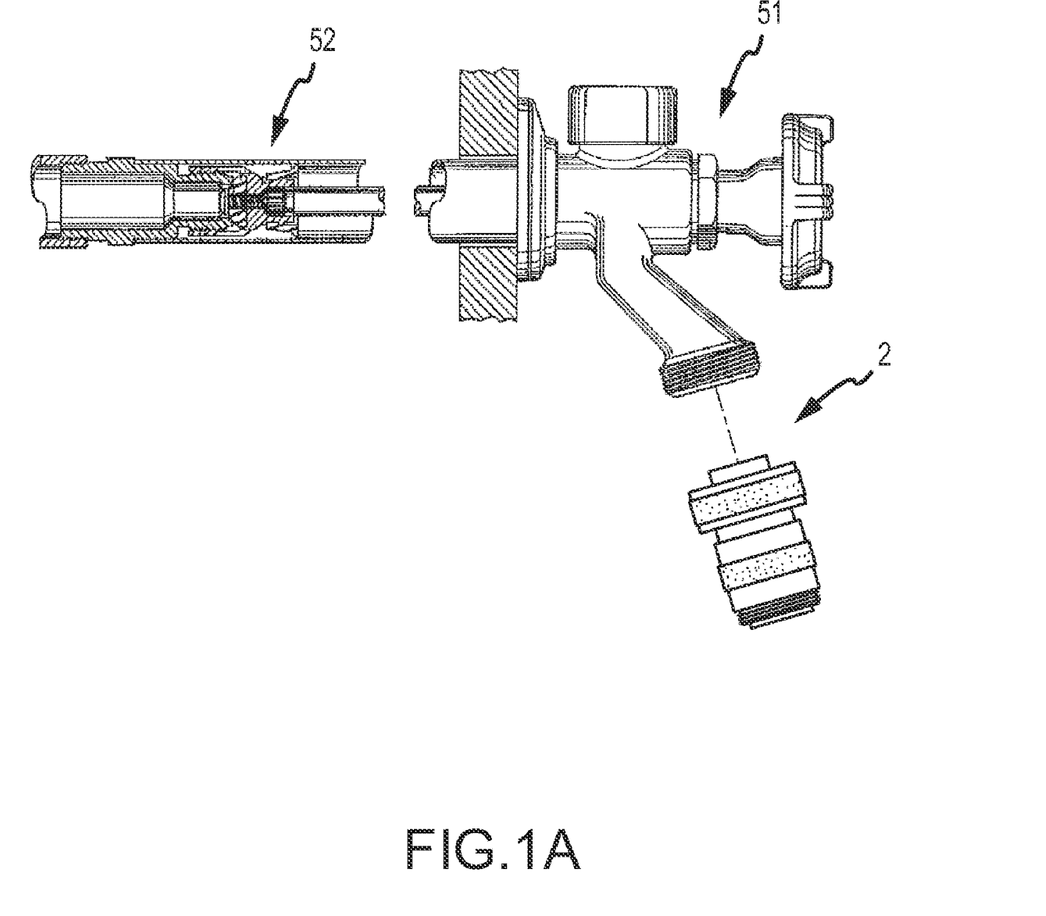
FIG. 1A is a partial cross-sectional view of the double check valve of one embodiment of the present invention associated with a faucet.

Referring now to FIGS. 1 and 1A, a double check valve 2 of one embodiment of the present invention is shown. Preferably, the components of double check valve 2, which will be described in further detail below, are constructed of a rigid material commonly used in the plumbing arts, such as brass. However, one skilled in the art will appreciate other suitable materials may be utilized without deviating from the scope of the invention. The double check valve 2 includes a valve body 14 that is interconnected to a valve cap 18. The valve cap 18 is the inlet 30 of the double check valve 2 and employs a plurality of threads 42 (or a bayonet fitting), positioned on its outer and/or inner surface thereof, for interconnection to a sill cock of a faucet. The valve body 14 is preferably a cylindrical member that may include a knurled 46 outer surface that aids in the interconnection of the double check valve 2 to a fluid source. The double check valve 2 also includes a plurality of vents 22 that allow fluid and/or air to escape from the internal volume thereof. The valve body 14 also includes a plurality of threads 42 positioned about an outlet 26 of the double check valve 2. A hose plunger 50 is selectively interconnected to the valve body 14 and is designed to coincide with the outlet 26 of the double check valve 2 when a hose 4 is interconnected thereto. FIG. 1A illustrates an embodiment of the double check valve 2 in association with a faucet 51, also referred to as a sill cock. The faucet 51 employs a valve 52 to control the flow of water.

Figure 2:
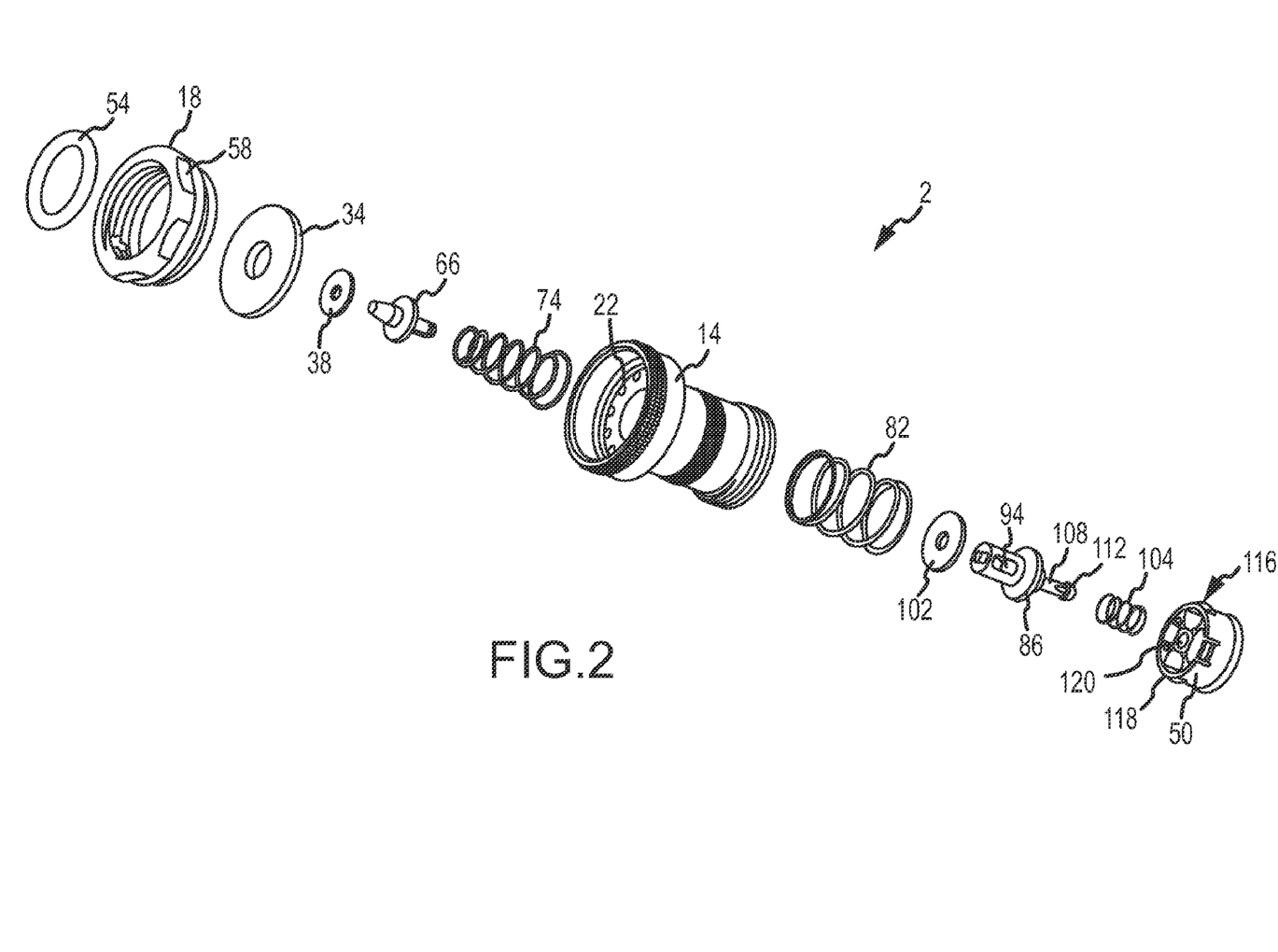
FIG. 2 is an exploded perspective view of the double check valve shown in FIG. 1.
Figure 3:
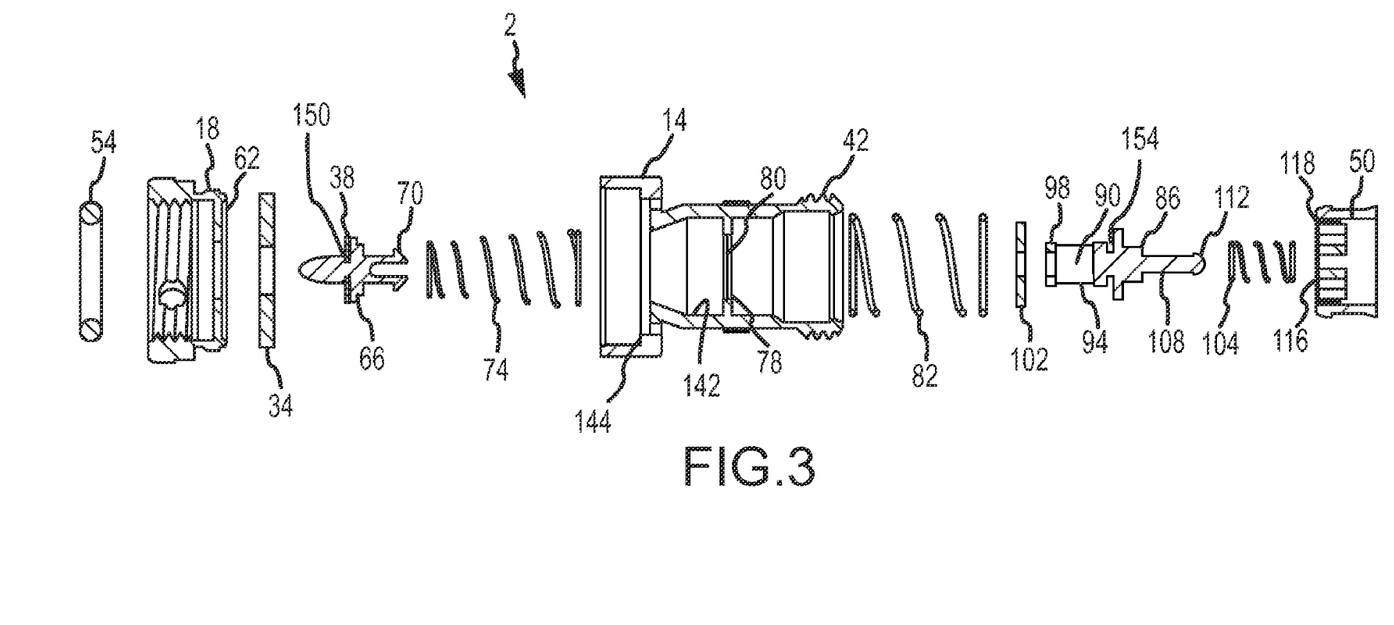
FIG. 3 is a cross-sectional view of FIG. 2.

Referring now to FIGS. 2 and 3, exploded views of one embodiment of the present invention are provided. An o-ring 54 is positioned within the valve cap 18. One of skill in the art will appreciate the sealing function provided by the o-ring 54 may be performed by a flat seal or any other sealing member, or combination thereof, without departing from the scope of the invention. The valve cap 18 may also include a plurality of wrench flats 58 for securely interconnecting the double check valve 2 to a sill cock, for example. The valve cap 18 also includes an annular jut 62 that interfaces with the main seal 34 of the double check valve 2. Between the main seal 34 and the valve body 14 resides an inlet check body 66 that includes a lower end with a protruding, or hooked surface 70. The inlet check body 66 receives the inlet check seal 38 on one end and an inlet check spring 74 on the other end. The inlet check spring 74 rests on an internal wall, or seat 78, provided within the valve body 14. Alternatively, the inlet check spring 74 may contact and outlet check body 86. The seat 78 defines a passage 80 that allows fluid to flow from the inlet check valve 6 to the outlet check valve 10. The valve body 14 also includes threads 42 that receive a hose.

The seat 78 is also associated with a drain spring 82 that is positioned about the outlet check body 86. The outlet check body 86 includes a hollow portion 90 having a slot 94 bounded by a stop 98. The stop 98 cooperates with the hooked surface 70 of the inlet check body 66, thereby operably interconnecting the inlet check body 66 and the outlet check body 86. The outlet check body 86 includes an outlet check seal 102 and an outlet check spring 104 positioned about a cylindrical portion 108 thereof. Finally, the outlet check body 86 includes a lower protrusion 112 that is snap fit within a hub 116 of the hose plunger 50.

An upper surface 118 of the hose plunger 50 is engaged to the drain spring 82 wherein its lower portion is adapted to contact a hose. The hose plunger 50 also includes a lip that engages an inner surface of the valve body 14 when a hose is interconnected thereto that prevents further insertion of the hose plunger 50 into the double check valve when the hose is interconnected. The hose plunger 50 of one embodiment of the present invention is a snap fit within the valve body 14 such that the lip 120 of the hose plunger 50 engages a stop 124 provided adjacent to the outlet of the valve body 14 when a hose is not interconnected to the valve body 14.

Figure 4:
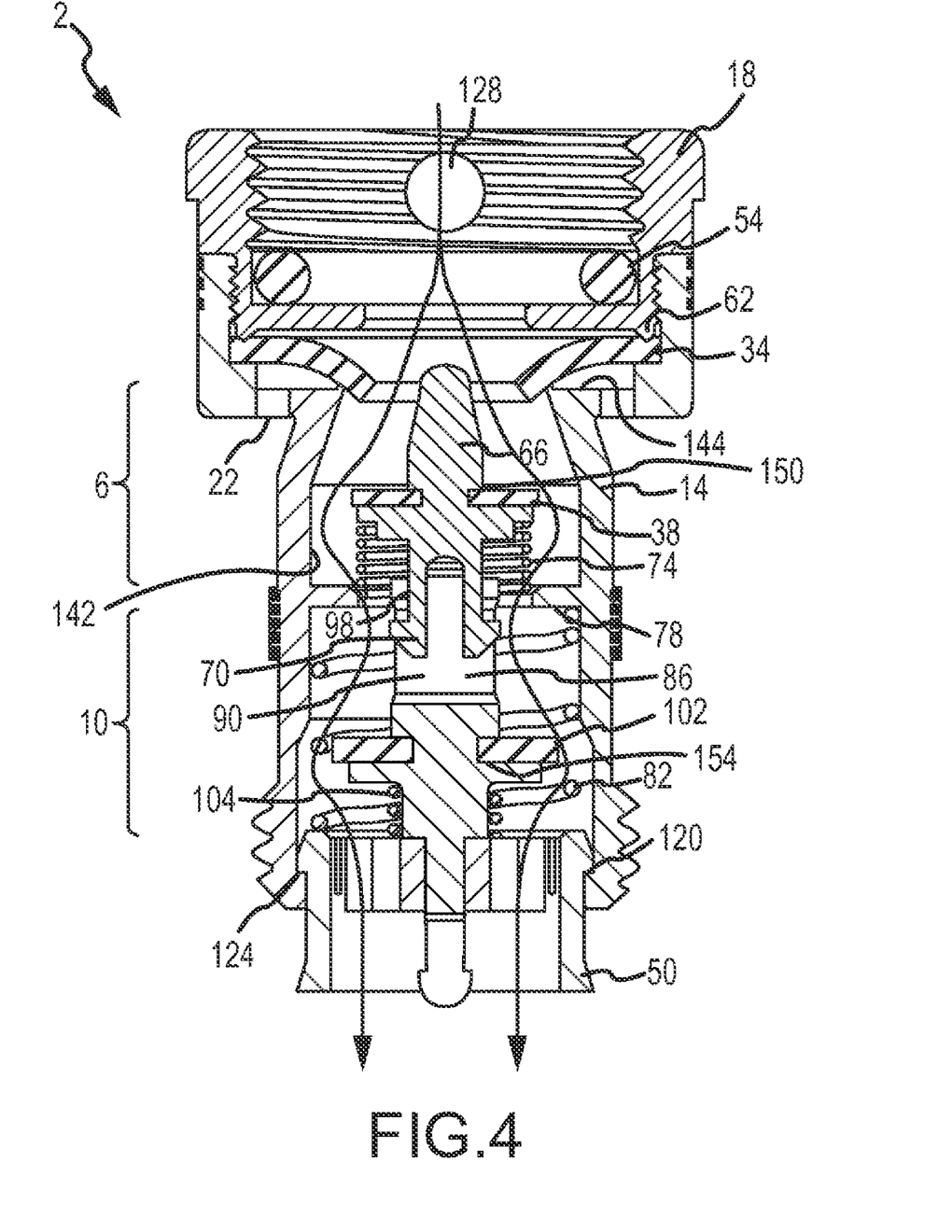
FIG. 4 is a cross-sectional view of FIG. 1 showing an open flow configuration wherein the double check valve is interconnected on one end to a sill cock and opened on the other end.

Referring now to FIG. 4, the double check valve 2 of one embodiment is shown during an open flow condition. Here, the valve cap 18 is shown interconnected to the valve body 14. The valve cap 18 may include a thumbscrew aperture 128 to receive a thumbscrew that allows a user to tightly (an often permanently) affix the double check valve 2 onto a sill cock. A main seal 34 is positioned between the annular jut 62 of the valve cap 18 and the valve body 14. Embodiments of the present invention interference fit the valve cap 18 onto the valve body 14. One skilled in the art, however, will appreciate that the valve cap 18 may be screwed, welded or otherwise interconnected to the valve body 14. An o-ring 54 resides within the valve cap 18 and is adapted to provide a seal between the sill cock and the valve cap 18.

FIG. 4 shows an open flow condition wherein the supply pressure exists but no hose is interconnected to the double check valve 2. The hose plunger 50 is biased by the drain spring 82 such that the lip 120 of the hose plunger 50 contacts the stop 124 of the valve body 14. Supply pressure forces the main seal 34 to deflect downwardly, which blocks fluid flow through the vents 22. This configuration is substantially different from the V-444 configuration described above. During an open flow condition with no interconnected hose, the V-444 valve will allow fluid to escape out of the vents that wastes water. Supply pressure also forces the inlet check body 66 downwardly, which compresses the inlet check spring 74. The supply pressure in this configuration is sufficient enough to transition the outlet check seal 102 downwardly and to compress the outlet check spring 104 to separate the outlet check seal 102 and seat 78.

Figure 5:
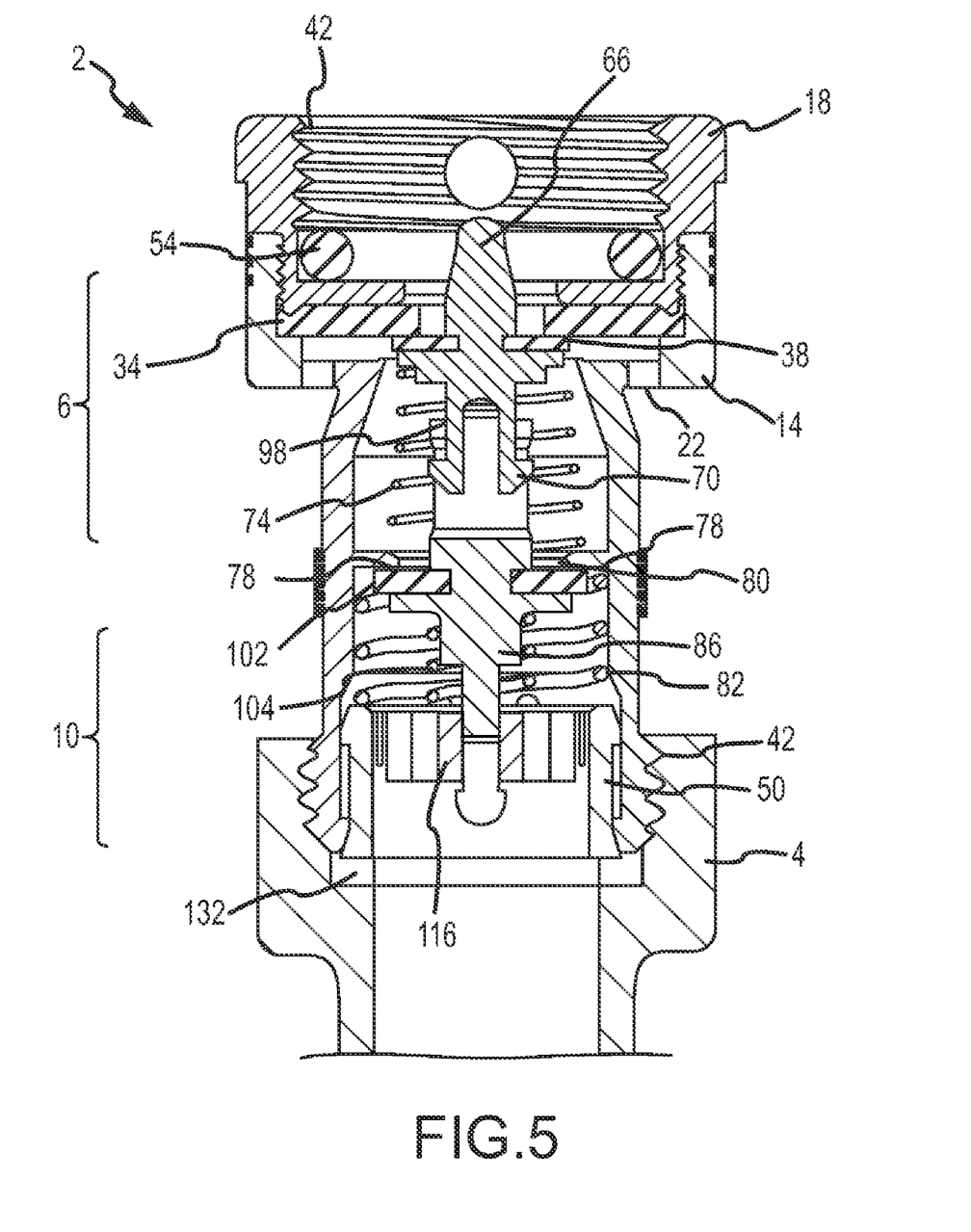
FIG. 5 is a cross-sectional view of FIG. 1 showing a no flow configuration wherein the double check valve is interconnected to a sill cock and a hose.

Referring now to FIG. 5, the double check valve 2 is shown with the hose 4 interconnected during a non-flow condition. In this configuration, connection of the hose 4, which includes a hose washer 132, forces the hose plunger 50, and thus the hub 116 thereof, axially upward. The upward motion of the hose plunger 50 compresses the outlet check spring 104, which forces the outlet check body 86 upwardly such that the outlet check seal 102 engages the seat 78. Thus, interconnection of the hose 4 completely isolates the outlet check valve 10 from the inlet check valve 6. If any back flow causing pressure rise in the hose 4 occurs, the seal between the outlet check seal 102 and its seat 78 will prevent fluid from entering the fluid source, unless those components have failed (for example, debris lodged between the outlet check seal 102 and the seat 7 that allows for fluid infiltration). Since there is no flow from the fluid supply, the inlet check spring 74 and the inlet check body 66 will be positioned upwardly so that the inlet check seal 38 is engaged to the main seal 34. Thus, the inlet check valve 6 is isolated from the valve cap 18 that is interconnected to the fluid source. The inlet check valve 6 is, however, in fluidic communication with the vents 22 wherein any fluid pressurized by the transitioning outlet check body 86 will exit therethrough.

Figure 6:
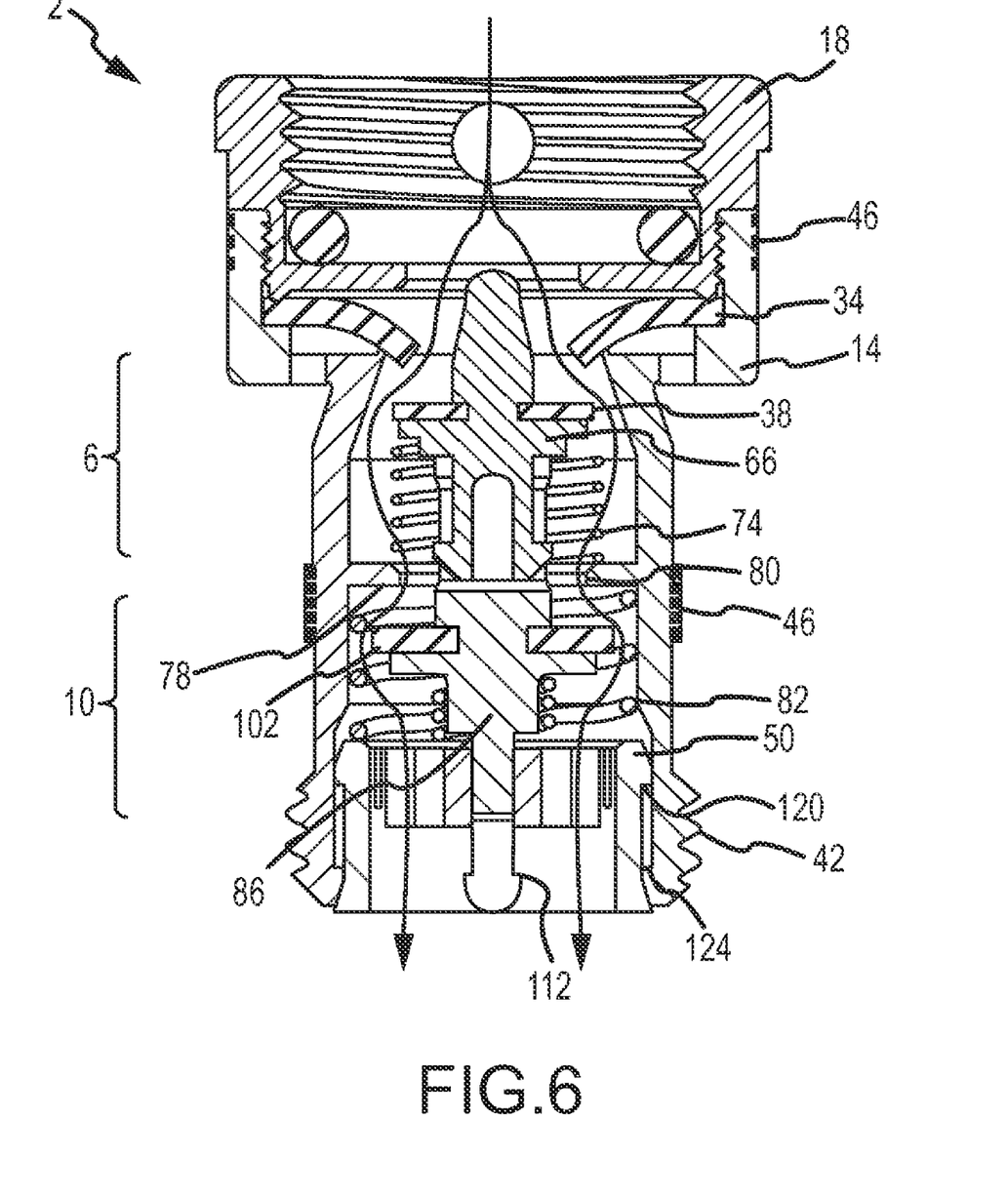
FIG. 6 is a cross-sectional view of FIG. 1 showing a closed flow configuration wherein the double check valve is interconnected to a sill cock and a hose.

Referring now to FIG. 6, a closed flow condition is shown wherein the hose (not shown) is interconnected to the valve body 14 and the fluid supply has been opened. Here, supply pressure deflects the inner diameter of the main seal 34 downwardly such that the main seal 34 blocks the vents 22. Supply pressure also acts on the inlet check seal 38 to force it downwardly which compresses the inlet check spring 74. As described above, since the hose is interconnected to the valve body 14, the hose plunger and the outlet check body 86 will be shifted upwardly. The inlet check body, however, will contact the outlet check body 86 and force it downwardly, thereby counteracting the outlet check seal and opening the passage 80 between the inlet check valve 6 and the outlet check valve 10.

Figure 7:
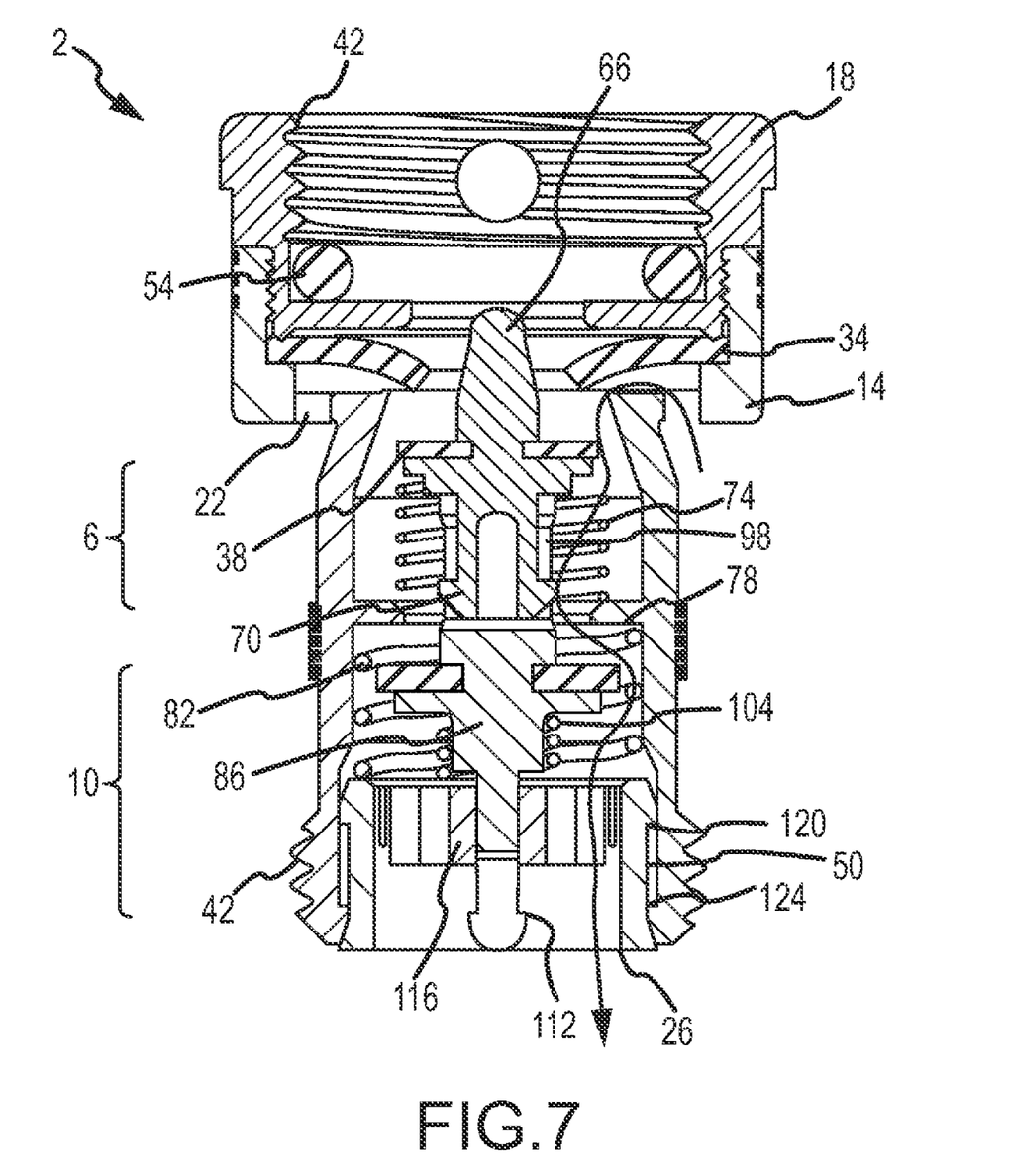
FIG. 7 is a cross-sectional view of FIG. 1 showing a double check valve in a siphon condition.

Referring now to FIG. 7, a non-flow configuration wherein a siphon has occurred is shown subsequent to the removal of supply pressure with the hose (not shown) interconnected to the valve body 14. A siphon condition may be caused when gravity-induced flow of the water in the hose pulls a vacuum after the supply pressure has been shut off. The vacuum within the inlet check valve 6 and the outlet check valve causes the main seal 34 and the outlet check body 86 to deflect towards the outlet of the double check valve 2. The outlet check body 86 translates downwardly until it contacts the hub 116 of the hose plunger 50. The inlet check spring 74 pushes the inlet check body 66 upwardly. However, the hooked surface 70 of the inlet check body 66 will engage with the stop 98 of the outlet check body 86, thereby limiting the range of motion of the inlet check body 66 and preventing the inlet check seal 38 from closing the main seal 34. That is, during a siphoning condition, the inlet check seal 38 will not be able to fully flatten the main seal 34. As a result, the deflected main seal 34 will be prevented from completely blocking the vents 22. A path between the inlet check seal 38 and the internal surface of the inlet check valve 6 will allow air from the outside of the double check valve 2 to enter through the vents 22 to break the vacuum which allows the outlet check spring 104 to relax and engage the outlet check valve 10 on the seat 78. This in turn will allow the inlet check body 66 to transition upwardly to engage the inlet check seal 38 onto the main seal 34 to isolate the inlet check valve 6 and the outlet check valve 10 from the valve cap 18 as shown in FIG. 5.

Figure 8:
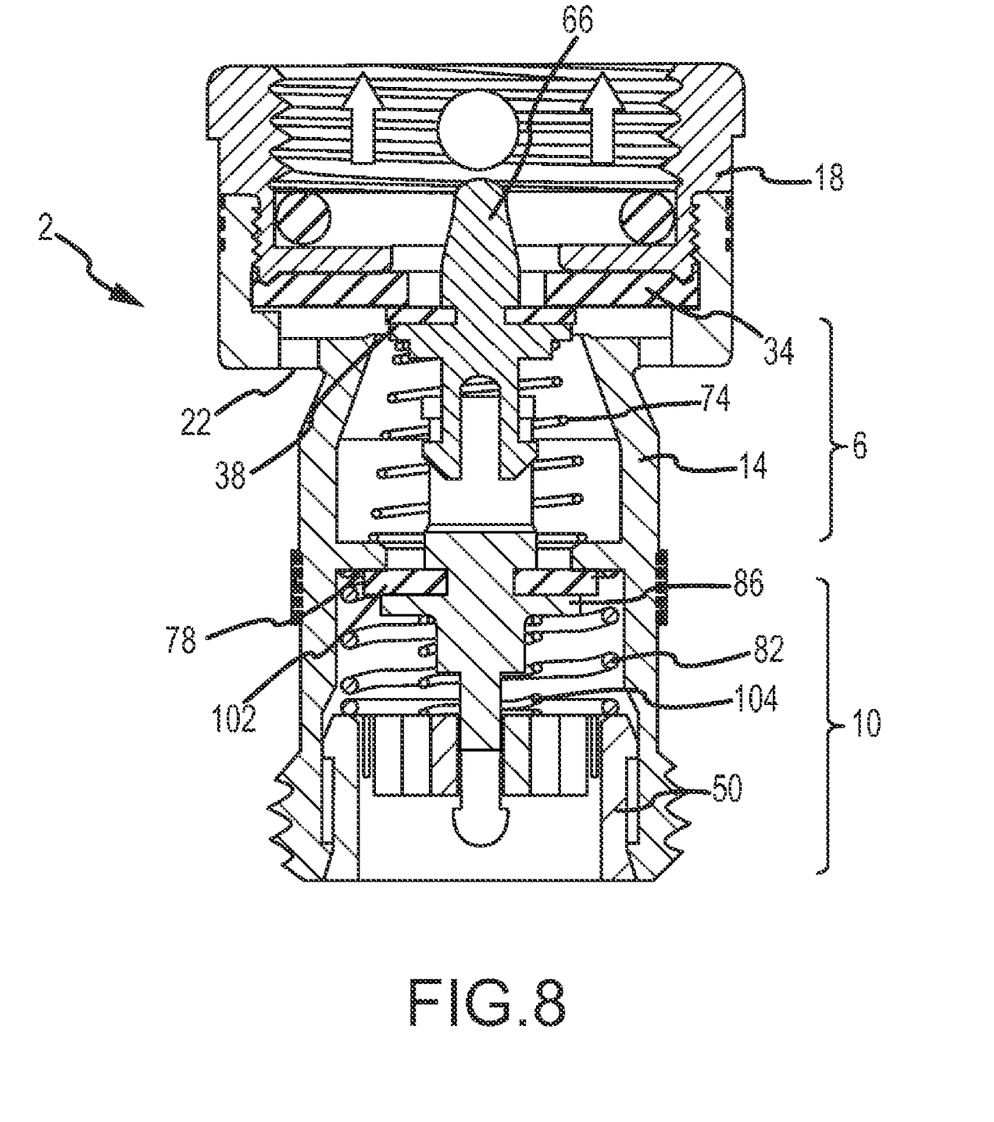
FIG. 8 is a cross-sectional view of FIG. 1 showing the double check valve exposed to back siphonage.

Referring now to FIG. 8, a back siphonage situation is shown. Here, the hose (not shown) is interconnected to the valve body 14 and a vacuum has occurred at fluid supply that could cause contaminated fluid from the hose or double check valve 2 to enter the fluid supply. In operation, the hose forces the hose plunger 50 upwardly that compresses the drain spring 82. The hub 116 of the hose plunger 50 also moves upwardly and forces, via the outlet check spring 104, the outlet valve check body 86 to move upwardly so that outlet check seal 102 engages the seat 78. The vacuum in the valve cap 18 pulls the inlet check seal upwardly to engage the main seal 34. Thus the outlet check valve 10 is isolated from the inlet check valve 6 and the inlet check valve 6 is isolated from the cap valve 18 which is interconnected to the fluid supply, and no fluid from the hose and/or the double check valve can enter the fluid supply.

Figure 9:
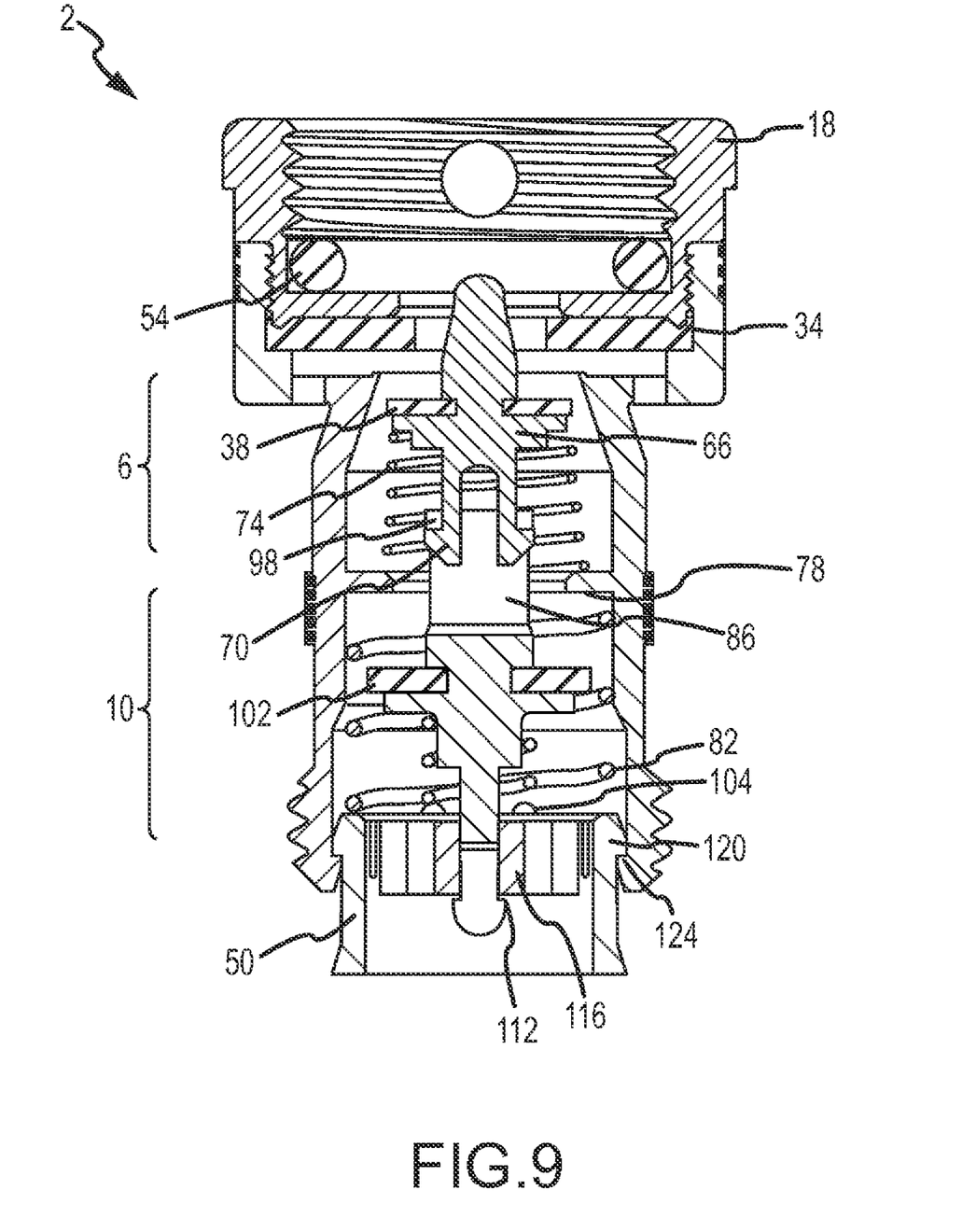
FIG. 9 is a cross-sectional view of FIG. 1 showing the double check valve subsequent to hose removal.

Referring now to FIG. 9, draining of the double check valve 2 is illustrated. After the hose is removed, the drain spring 82 expands and forces the hose plunger 50 downwardly such that the lip 120 of the hose plunger 50 contacts the stop 124 of the valve body 14. The hub 116 of the hose plunger 50 will also contact the protrusion 112 of the outlet check body 86 and pull the outlet valve body 86 downwardly, which removes the outlet check seal 102 from the outlet check seat 78. The stop 98 of the outlet check body 86 will contact the hooked surface 70 of the inlet check body 66 and pull the inlet check seal 38 from the main seal 34. Thus, a free flow path from the inlet check valve 6 into the outlet check valve 10 and out of the hose plunger 50 is provided. Water in the sill cock will also be able to flow through the valve cap 18 and through the inlet check valve 6, the outlet check valve 10 and out of the hose plunger 50. Fluid may also drain through the plurality of vents provided.

Figure 10:
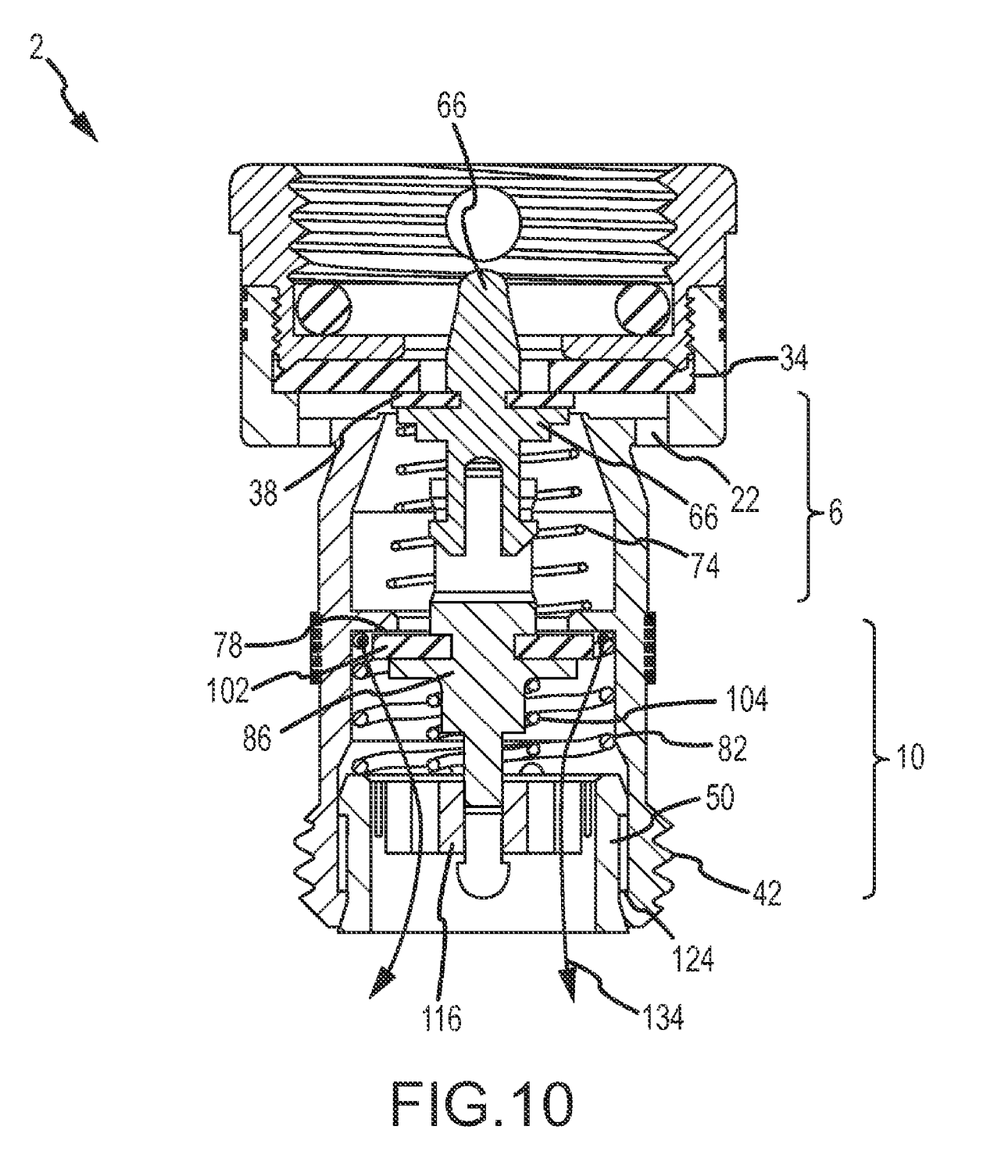
FIG. 10 is a cross-sectional view of FIG. 1 showing the double check valve during testing.

Referring now to FIG. 10, the double check valve 2 is shown during a test. More specifically, it is one aspect of the present invention that the double check valve 2 of embodiments of the present invention can be easily tested in the field to ensure that it is in proper working condition. Here, the hose (not shown) is interconnected to the threads 42 of the valve body 14 that forces the hose plunger 50 upwardly and compresses the drain spring 82. The hub 116 is also forced upwardly which compresses the outlet check spring 104 and forces the outlet check seal 102 against seat 78. If the double check valve 2 is working properly the outlet check valve 10 should be isolated from the vents 22. Fluid 134 is then added via the hose and into the outlet 26 of the double check valve 2. If the integrity of the outlet check valve 102 and the seat 78 are adequate, no fluid will enter the inlet check valve 6. Conversely, if the integrity between the outlet check seal 102 and the seat 78 is broken, fluid 134 will fill the inlet check valve 6, and will exit from the plurality of vents 22. The inlet check spring 74 will force the inlet check body 66 upwardly to place the inlet check seal 38 in contact with the main seal 34 to prevent any fluid from entering the water source during this test.

Figure 11:
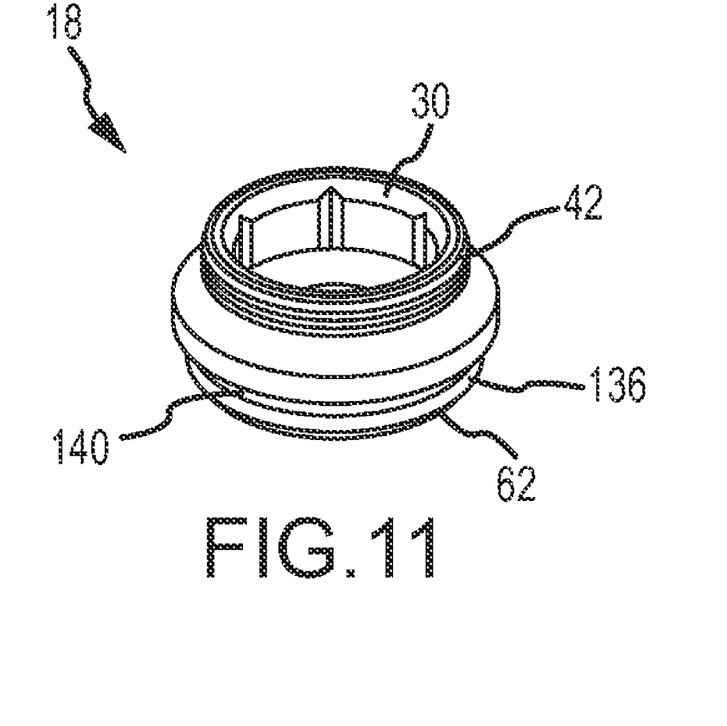
FIG. 11 is a valve cap of an alternate embodiment of the present invention.
Figure 12:
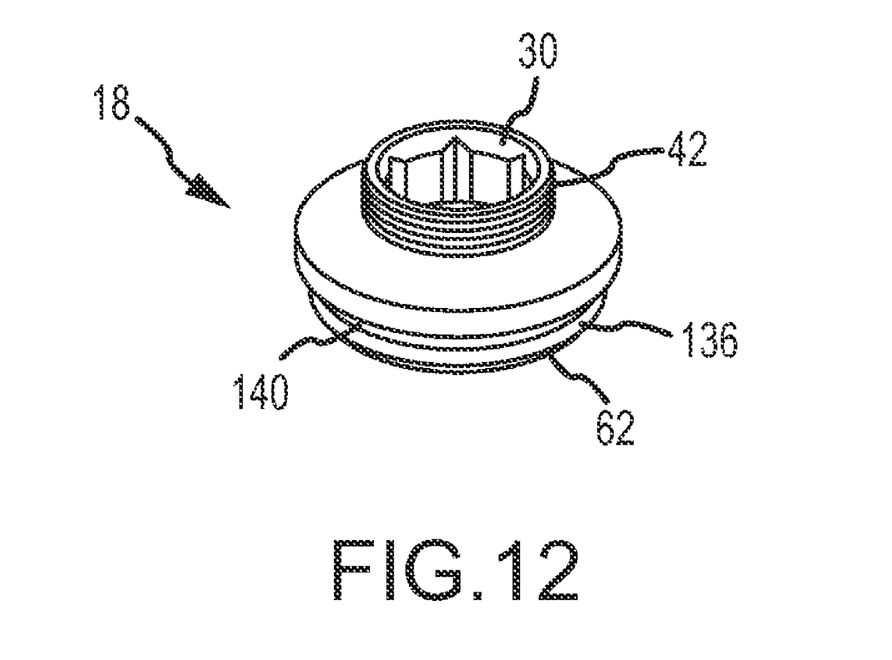
FIG. 12 is a valve cap of an alternate embodiment of the present invention.

Referring now to FIGS. 11 and 12, valve caps 18 of alternate embodiments of the present invention are provided. Here, the annular jut 62, which interfaces with the main seal 34 and ring 136, which interfaces with a groove 140 provided on the valve body 14 are substantially the same as those described above. However, the inlet portion 30 of the valve cap 18 includes a plurality of exterior threads 42 for threading onto sill cocks and have inwardly threads 42. Inspection of FIGS. 11 and 12 will show that the inlets 30 of these valve caps 18 are of different diameters, thereby succinctly illustrating the scalability of the present invention.

One of skill in the art will appreciate that the valve described and shown herein may be interconnected to the sill cock via a bendable or telescoping member to provide the ability to selectively locate the valve. Alternatively, or in addition, valves as described may possess telescoping functionality as shown in U.S. Design Pat. No. D491,253 to Hansle. The valve may also employ a timer, flow regulation capabilities, etc. to control the flow of fluid therefrom. The valve may employ more than one outlet, which each may include valving as described, and may employ a combination of materials as described in Tripp. Further, the valve may be directly integrated into the sill cock instead of interconnected thereto. The system described herein may include a visual or audible alarm to notify the instance of a valve failure.

While various embodiments of the present invention have been described in detail, it will be apparent that modifications and alterations of those embodiments are also intended to be encompassed by this description. However, it is to be expressly understood that such modifications and alterations are within the scope and spirit of the present invention, as set forth in the following claims. For example, aspects of inventions disclosed in U.S. Patent and Published Patent Application Nos. 5632303, 5590679, 7100637, 5813428, and 20060196561, all of which are incorporated herein by this reference, which generally concern back flow prevention, may be incorporated into embodiments of the present invention. Aspects of inventions disclosed in U.S. Pat. Nos. 5,701, 925 and 5,246,028, all of which are incorporated herein by this reference, which generally concern sanitary hydrants, may be incorporated into embodiments of the present invention. Aspects of inventions disclosed in U.S. Pat. Nos. 6,532, 986, 6,805,154, 6,135,359, 6,769,446, 6,830,063, RE39235, 6,206,039, 6,883,534, 6,857,442 and 6,142,172, all of which are incorporated herein by this reference, which generally concern freeze-proof hydrants, may be incorporated into embodiments of the present invention. Aspects of inventions disclosed in U.S. Patent and Published patent application Nos. D521113, D470915, U.S. Pat. Nos. 7,234,732, 7,059, 937, 6,679,473, 6,431,204, 7,111,875, D482431, 6,631,623, 6,948,518, 6,948,509, 20070044840, 20070044838, 20070039649, 20060254647 and 20060108804, all of which are incorporated herein by this reference, which generally concern general hydrant technology, may be incorporated into embodiments of the present invention.

What is claimed is:
1. A back flow prevention device, comprising:
a valve body with a fixed inlet volume; and
an inlet check valve positioned within said inlet volume, said inlet check valve comprising:
an inlet check spring positioned within said inlet volume;

an inlet check body partially positioned within said inlet check spring;

an inlet check seal fixedly interconnected to said inlet check body;

wherein said valve body further comprises a fixed outlet volume, wherein said inlet volume and said outlet volume are separated by a wall; and an outlet check body positioned within said fixed outlet volume, wherein said inlet check body is slidingly interconnected to said outlet check body, and wherein said inlet check body and said outlet check body are configured to selectively open a flow path between said inlet volume and said outlet volume or isolate said inlet volume from said outlet volume.

2. The device of claim 1, wherein said inlet check spring contacts an upper surface of said wall.

3. The device of claim 1, wherein said fixed inlet volume is generally defined by an inner surface of said valve body, a seat that extends from said inner surface of said valve body, and a bottom inner surface of said inlet valve body.

4. The device of claim 1, further comprising a seal, wherein said inlet check seal is adapted to selectively engage said seal, thereby opening and closing an aperture of said seal to prevent fluid flow into said inlet volume.

5. The device of claim 4, further comprising a valve cap, wherein said seal is positioned between said valve cap and said valve body.

6. The device of claim 4, wherein said valve body further comprises a vent for allowing fluid from inside said valve body to escape, and wherein said seal is adapted to selectively block said vent.

7. A back flow prevention device, comprising:

a valve body with a fixed outlet volume;

an outlet check valve positioned within said outlet volume, said outlet check valve comprising:

an outlet check spring positioned within said outlet volume;

an outlet check body partially positioned within said outlet check spring;

an outlet check seal fixedly interconnected to said outlet check body;

wherein said valve body further comprises a fixed inlet volume, wherein said inlet volume and said outlet volume are separated by a wall; and an inlet check body positioned within said fixed inlet volume, wherein said inlet check body is slidingly interconnected to said outlet check body, and wherein said inlet check body and said outlet check body are configured to selectively open a flow path between said inlet volume and said outlet volume or isolate said inlet volume from said outlet volume.

8. The device of claim 7, wherein a drain spring contacts a lower surface of said wall and a plunger.

9. The device of claim 7, wherein said outlet check body is interconnected to a hub of a plunger.

10. The device of claim 7, wherein said fixed outlet volume is generally defined by an inner surface of said valve body, a seat that extends from said inner surface of said valve body, and a stop located at an end of said valve body.

11. The device of claim 7, further comprising a drain spring, wherein said outlet check body is partially positioned within said drain spring.

12. The device of claim 11, wherein said outlet check spring contacts a portion of said outlet check body and a hub of a plunger.

13. A back flow prevention device, comprising:

a valve body with a fixed inlet volume and a fixed outlet volume;

an inlet check valve positioned within said inlet volume, said inlet check valve comprising:

an inlet check spring positioned within said inlet volume;

an inlet check body positioned within said inlet check spring; and an inlet check seal fixedly interconnected to said inlet check body; and an outlet check valve positioned within said outlet volume, said outlet check valve comprising:

an outlet check spring positioned within said outlet volume;

an outlet check body positioned within said outlet check spring; and an outlet check seal fixedly interconnected to said outlet check body; and wherein a portion of said inlet check body is inserted into and slidingly interconnected to said outlet check body.

14. The device of claim 13, wherein said inlet check valve and said outlet check valve are configured to selectively open a flow path between said inlet volume and said outlet volume or isolate said inlet volume from said outlet volume.

15. The device of claim 13, wherein said inlet check valve and said outlet check valve are positioned adjacent to each other and separated by a seat that extends from said inner surface of said valve body.

16. The device of claim 13, further comprising a valve cap and a seal positioned between said valve cap and said valve body.

17. The device of claim 16, wherein said outlet check body is interconnected to a plunger.

* * * * *